United States Patent [19]

Phillips et al.

[11] Patent Number: 4,796,656

[45] Date of Patent: Jan. 10, 1989

[54] METHOD AND APPARATUS FOR CAUSING A SERIES OF MECHANICAL ACTIONS

[76] Inventors: Robert E. Phillips, 12217 Iredell St., Studio City, Calif. 91601; Ben A. Otsap, 7661 Airport Blvd., Los Angeles, Calif. 90045

[21] Appl. No.: 17,324

[22] Filed: Feb. 20, 1987

[51] Int. Cl.⁴ .................. F16K 31/365; A47C 27/10
[52] U.S. Cl. ..................... 137/106; 137/624.14; 137/625.66; 137/625.69; 251/75; 91/191; 91/193; 91/344; 91/518; 5/455
[58] Field of Search ............ 137/106, 624.14, 625.66, 137/625.69; 91/191, 193, 318, 344, 517, 518; 5/449, 455, 456; 251/61, 61.2, 75

[56] References Cited

U.S. PATENT DOCUMENTS

| | | | |
|---|---|---|---|
| 2,072,403 | 3/1937 | Lausen | 137/106 |
| 2,814,310 | 11/1957 | Lower | 251/75 X |
| 3,462,778 | 8/1969 | Whitney | 5/455 |
| 3,703,188 | 11/1972 | Wagner | 251/75 X |
| 3,794,075 | 2/1974 | Stoll et al. | 251/75 X |
| 3,919,730 | 11/1975 | Regan | 5/456 |
| 4,190,286 | 2/1980 | Bentley | 297/284 |
| 4,617,690 | 10/1986 | Grebe | 5/455 X |

Primary Examiner—John Rivell
Attorney, Agent, or Firm—Edward D. O'Brian

[57] ABSTRACT

A feedback type of diversion valve which can be used to sequentially "operate" or "activate" fluid responive structures such as tubes of a pillow.

23 Claims, 4 Drawing Sheets

METHOD AND APPARATUS FOR CAUSING A SERIES OF MECHANICAL ACTIONS

BACKGROUND OF THE INVENTION

The invention set forth in this specification pertains to both a new and improved method and a new and improved apparatus sequential using either a compressed fluid or a vacuum in order to cause a series of mechanical actions. More specifically it pertains to a method and apparatus as indicated which are used for body stimulation or massage purposes.

Unfortunately generic language such as is used in the preceding to broadly indicate the nature and scope of the invention does not effectively indicate the actual nature of the invention. The latter is best illustrated by discussing a presently preferred utilization of the present invention in the field of body stimulation or massage. It is not considered necessary to attempt to delineate all conceivable uses of the concepts of the invention in order to delineate or explain the invention since the nature of the invention can be reasonably illustrated with reference to its preferred utilization.

It is well known that it is frequently desirable to massage or stimulate a body such as a human body for one or more of a variety of reasons which are unimportant to an understanding of the invention. Virtually everyone is familar with the fact that such stimulation can be accomplished manually or with any one of a series of different devices. Most commonly the equipment employed for body stimulation or massage is mechanical in nature. Usually—but not always—mechanical massage equipment is constructed so as to vibrate the portion of the body being treated.

In spite of the fact that many different items of mechanical equipment have been developed for use in massaging or stimulating the body, it is believed that there still exists a need for new and improved massage equipment. More specifically it is considered that there exists a need for equipment which can be used to support a part or all of the human body and to concurrently gently stimulate the body as it supported in such a manner that an individual will not normally experience any discomfort and will normally not be distracted to such an extent as to interfere with the performance of a common task such as driving a car or truck, watching television or the like.

BRIEF SUMMARY OF THE INVENTION

The invention is intended to fulfill the need indicated in the preceding paragraph. In connection with this it is intended to provide an apparatus for sequentially massaging or stimulating at least a part of a body: which will apply a reasonable gentle, "rolling" type of pressure to the body: which is capable of being easily and conveniently constructed at a comparatively nominal cost; which may be used for prolonged periods with little or no maintenance; which may be easily serviced in the event that this should become necessary; which, depending upon constructional details, may be operated by either a vacuum or by any fluid under pressure; and which can be directly used or adapted so as to be used for a variety of different massage or stimulation purposes. The invention is also intended to supply new and improved apparatus for sequentially causing a series of mechanical actions for other purposes than massaging or stimulating the human body which has all of the desirable aspects indicated in the preceding paragraph. No significant reason is seen for repeating or rephrasing the latter in this discussion.

It is not to be assumed from this discussion that the invention is only concerned with specific apparatus or equipment. It is also concerned with a new and improved method of causing a sequential series of mechanical actions which may be easily practiced. As will be apparent from the preceding discussion, it is significantly concerned with a method for massaging or stimulating the human body with a series of gently applied, more or less "rolling" actions which is not particularly distracting and which can be used as a user performs a secondary function such as driving a vehicle, watching television or the like as indicated in the preceding in connection with the apparatus aspects of the invention.

The various "objectives" indicated in the preceding discussion are accomplished by providing an apparatus for sequentially performing a repetitive series of mechanical actions having a series of independently operating action means for providing a mechanical movement in response to changes in fluid pressure and regulating means for causing changes in the pressure of a fluid supplied to each of said action means in which the improvement comprises: said regulating means comprising feedback valve means for controlling fluid flow to and from said action means, said valve means having an inlet and outlets, each of said outlets corresponding to and connected to one of said action means, said valve means being capable of commencing an operating cycle by connecting said inlet to one of said action means until such action means is operated by the production of a pressure differential and then in response to such pressure differential in said one of said action means automatically connecting said inlet to another of said action means until said other of said action means is operated by the production of a pressure differential and then repeating the operating cycle.

BRIEF DESCRIPTION OF THE DRAWINGS

Because of the nature of this invention it is considered that it is best explained in further detail with reference to the accompanying drawings in which.

The drawings are intended to show for explanatory purposes parts of and a complete apparatus in accordance with this invention which are constructed in accordance with or so as to use concepts of the present invention. It considered that those skilled in the field of mechanical massaging devices will have no significant difficulty in employing these concepts in a variety of differently constructed and operated apparatuses. Because of the nature of the invention and the latter this invention is to be considered as being limited solely by the appended claims forming a part of this disclosure.

DETAILED DESCRIPTION OF THE PREFERRED EMBODIMENTS

In FIGS. 1 to 5 of the drawings there is shown a composite, dual valve structure 10 which is preferably used in practicing the invention. The structure 10 in effect includes two separate identical valves 12a and 12b. This inclusion of the two valves 12a and 12b in the valve structure 10 is accomplished by forming a single housing body 14 in connection with the valve structure 10 so that it includes or carries two of each of the parts hereinafter described. This housing body 14 is a part of the complete housing 16 including two end caps 18. Both the housing body 14 and the end caps 18 are preferably formed out of an relatively rigid, inert material such as any of the many polymer compositions or metals used for rigid housings at the current time. In order to achieve economies of manufacturing, these parts are preferably formed out of a thermoplastic polymer by conventional injection molding techniques so as to include the various parts subsequently indicated.

Figure 1:
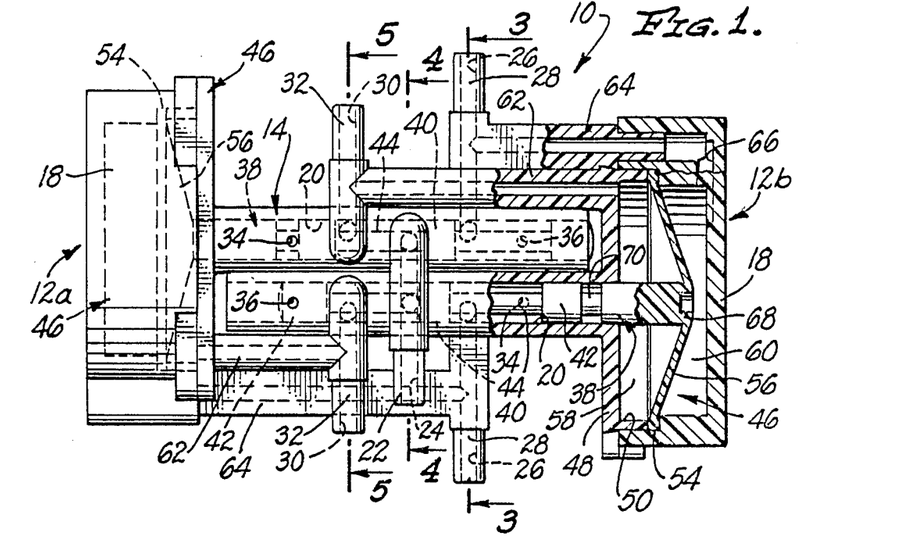
FIG. 1 is a side elevational view of a presently preferred embodiment of a dual valve which is used as regulating means in practicing this invention, this view being partially in section.
Figure 2:
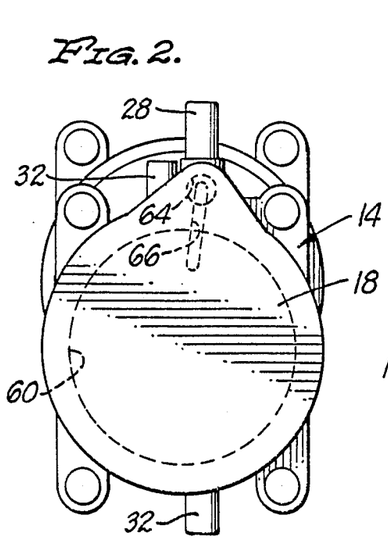
FIG. 2 is an elevational view of the right end of the valve shown in FIG. 1.
Figure 3:
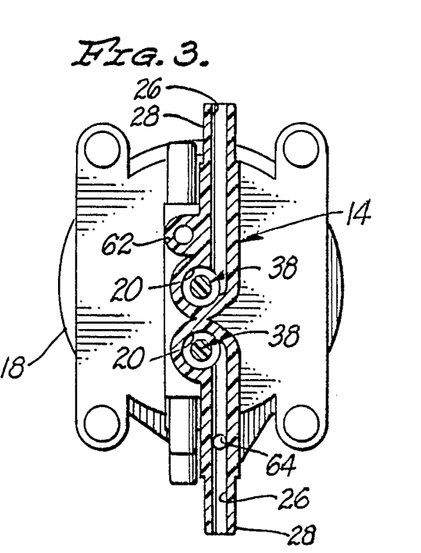
FIG. 3 is a cross-sectional view taken at line 3—3 of FIG. 1.
Figure 4:
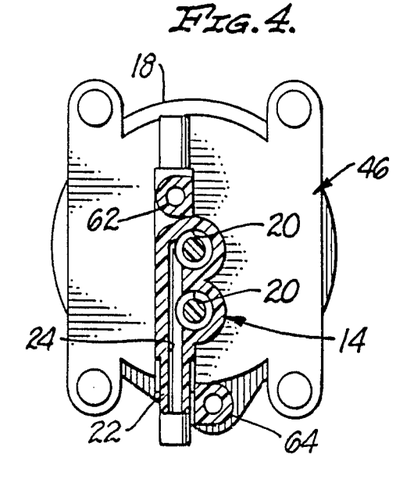
FIG. 4 is a cross-sectional view taken at line 4—4 of FIG. 1.
Figure 5:
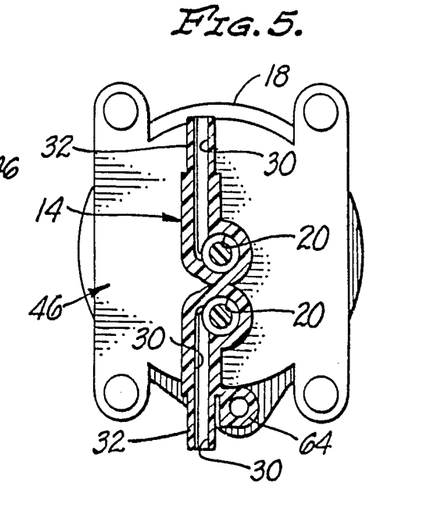
FIG. 5 is a cross-sectional view taken at line 5—5 of FIG. 1.

Each valve 12 includes in its housing 16 an elongated, open ended internal cavity 20 which is preferably in the form of a cylindrical bore. For this reason in the subsequent discussion each cavity 20 will be referred to as a bore 20 in order to facilitate an understanding of the valves 12. A small extension or nipple 22 serving as a manifold which is adapted to be connected to a source of fluid under pressure (not shown) or a vacuum source (not shown) is in communication with each housing body 14 as shown. An inlet passage or port 24 is located so as to extend through each extension 22 and so as to intersect the bore 20 of the body 14 on which the extension 22 is located approximately midway along the length of the bore 20.

Service or supply passages or ports 26 and 30 are located within other extensions or nipples 28 and 32, respectively, so as to lead from the bores 20 at equal distances from the ports 24 along the lengths of the bores 20. If desired these ports 26 and 28 can be termed outlets. Further, return or vent ports 34 and 36 extending into the bores 20 are located on the housing bodies 14 at equal distances from the inlet ports 23 along the lengths of the bores 20. If desired, members or nipples corresponding to the extensions 22, 28 or 32 can be used in connection with the vent ports 34 and 36 to convey the return of spent fluid back to a receptacle (not shown). They are not used on the valves 12 since these valves are intended for use with a pneumatic fluid—specifically compressed air.

These ports 34 and 36 are located further from the ports 24 than the ports 26 and 30. In effect with this structure the ports 26 and 34 are located to one side of the port 24 and the ports 30 and 36 are located to the other side of the port 24 along the length of the port 20 within a valve 20. This structure is to enable a valve body 38 to be shifted within each bore 20 so as to achieve a valving action. Each valve body 38 used in a valve 12 is formed in the manner of a common valve spool and, hence, for convenience of explanation is referred to in the following discussion as a valve spool 38. Each valve spool 38 includes a central cylinder 40 and terminal cylinders 42 joined together by a centrally located shaft 44. These cylinders 40 and 42 all fit closely within the bore 20 within which they are located so as to be capable of forming are nearly forming a seal with the interior of such bore 20. However, they do not fit so tightly as to preclude movement of the valve spool 38 of which they form a part.

It will be noted that each valve spool 38 is capable of being moved between a first position as shown in which it is located such that the inlet port 24 is in communication with a supply port 26 and is isolated from the other supply port 30 and such that the vent port 34 adjacent to the supply port 26 is closed off while the vent port 36 adjacent to the supply port 30 is in communication with this port 30 and is open to the ambient air and a second position in which the inlet port 24 is in communication with the supply port 30, the supply port 26 is in communication with ambient air through the vent port 34 and the vent port 36 is closed off.

Within the valve 12 the movement of the valve spool 38 between these two positions is accomplished through the use of what are referred to herein as "actuating means" 46. Such actuating means 46 in each valve 12 includes an enlarged end extension 48 on and forming a part of the housing body 14. The extension 48 in a valve 12 is generally cylindrical and includes a part of an internal cylindrical cavity 50 which is in axial alignment with and in communication with the bore 20. In a valve 12 the remainder of this cavity 50 is generally within an end cap 18. The cap 18 serves to close off on the extension 48 adjacent to it.

When the cap 18 is in place as shown in a valve 12, it holds or clamps the periphery 54 of a bistable diaphragm 56 in place against the extension 48 so as to divide the cavity 50 into a first compartment 58 and a second compartment 60. The first compartment 58 is in communication with the supply port 30 through a first tubular connector 62 while the second compartment 60 is in communication with the supply port 26 through a second tubular connector 64 and a small passage 66 located within the cap 18. The center 68 of the diaphragm 56 is mechanically connected to the terminal cylinder 42 on the valve spool 38 by means of a motion transmitting shaft 70. This shaft 70 is normally sufficiently thick so that it will not easily bend; it may appear as merely a continuation of the terminal cylinder 42 to which it is attached as shown.

Figure 6:
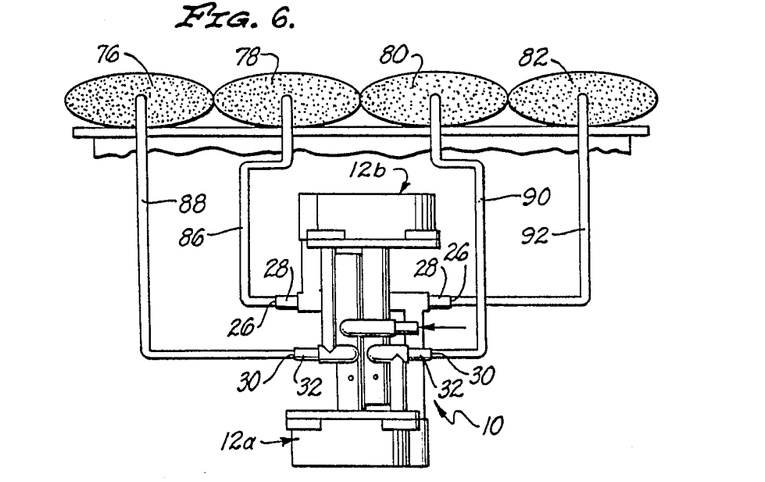
FIG. 6 is a diagrammatic view showing the valve illustrated in the preceding used in an assembly in a presently preferred manner in accordance with this invention in sequentially operating a series of attached inflatable tubes forming a support such as a seat bottom or a pad used on or as a part of a mattress.

The construction of this diaphragm 56 is considered to be quite important in connection with the valve 12. It must be shaped and constructed of a material capable of deflecting between a position as shown in FIG. 1 or FIG. 6 in which it is more or less conical in shape and is pointed generally away from the remainder of the valve 12 to a reverse position in which it is also more or less conical in shape and is pointed in the reverse direction. Further, a diaphragm 56 must be of such a character that when a pressure differential is applied across it as a result of the pressures in the adjacent compartments 58 and 60 being such that the highest pressure is in the compartment towards which the diaphragm 56 is pointed, it will automatically "flip" or pass through an over-center position as a result of an internal spring or spring-like action and the applied pressure so as to point in the other direction without stopping between these two positions. As this occurs, the forces causing the movement of a diaphragm 56 will be transmitted to the valve spool 38 so as to shift the spool 38 either from the first position previously described to the second position or vice versa depending upon the direction of the diaphragm 56 reorientation.

Normally the diaphragm 56 employed will be of such a nature that it will be completely stable in either of the two positions described until a pressure differential is applied which is sufficient to cause its defection from either position to the other. However, in some applications, it is possible to make the diaphragm 56 more or less like a bowed oil can bottom so that it is metastable in character. In this case a lesser amount of force has to be applied to one side of it to hold it in a second position that had to be applied to the same side of it to move it from a first position to the second. The use of a metastable diaphragm 56 is not normally preferred with the invention since as the valves 12 are normally used it is necessary for them to be bistable.

In practicing the invention a valve structure 10 as indicated in the preceding may be used with a cushion or pillow 72 as indicated in FIG. 6 of the drawings so as to create what may be referred to a complete apparatus 74 for sequentially performing a repetitive series of mechanical actions. In the case of the apparatus 74 the actions consist of the inflation of a series of four internally isolated tubes 76, 78, 80 and 82 which are physically connected in order to form the complete pillow 72. It is to be understood that these tubes 76, 78, 80 and 82 could be separate from one another and located so as to be used in association with one another in any desired manner.

The tubes 76, 78, 80 and 82 are all provided with inlet lines 84 which are used in connecting their interiors (not numbered) to tubular lines 86, 88, 90 and 92 associated with the tubes 76, 78, 80 and 82, respectively. The line 86 extends between the connector 64 of the valve 12a and the port 30 of the valve 12b; the line 88 extends between the connector 62 of the valve 12a and the port 26 of the valve 12b; the line 90 extends between the port 30 of the valve 12a and the connector 62 of the valve 12b; and the line 92 extends between the port 26 of the valve 12a and the connector 64 of the valve 12b.

Figure 8:
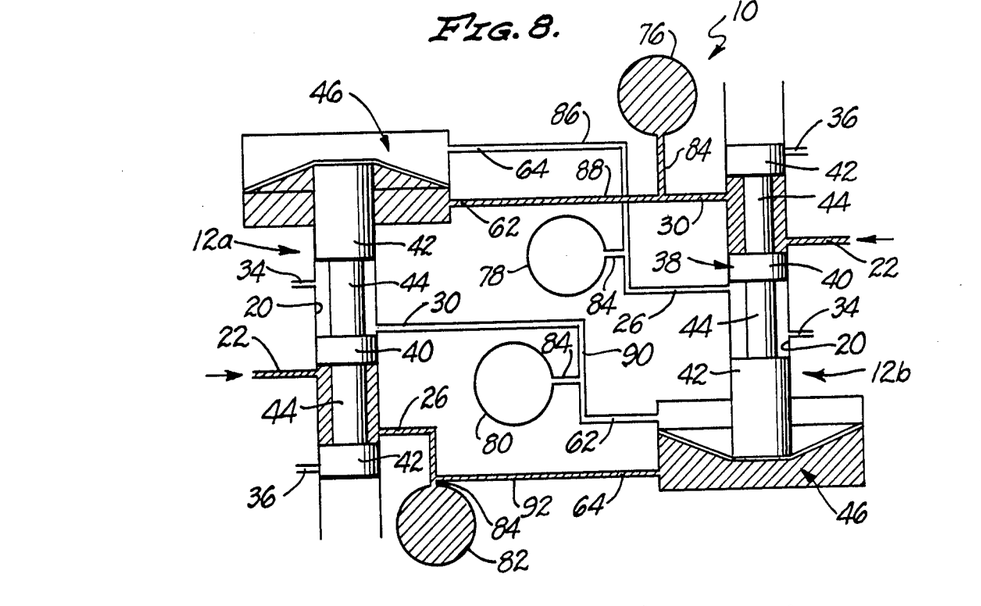
FIGS. 8–11 are diagrammatic views showing the operation of the assembly shown in FIG. 6.

In the preferred or intended manner of use of the complete apparatus 74 a source of a fluid under pressure (not shown)—specifically compressed air—will be connected to the inlets 22 of the valves 12a and 12b. When this is done and when the valve spools 38 and the diaphragms 56 are oriented in the valves 12a and 12b as illustrated in FIG. 8 in the valves 12a and 12b the compressed air will flow within the valve 12a to the port 26 and thence to the line 92. As this occurs the air will pass through an inlet line 84 to tube 82 so as to inflate it or so as to increase the pressure within it. As the tube 82 gradually fills or inflates the air under pressure will pass to the connector 64 in the other valve 12b so as to increase the pressure against the diaphragm 56 in the valve 12b.

Concurrently compressed air supplied to the valve 12b will move through its port 26 to the line 86 so as to inflate or increase the pressure within the tube 76 and, as this occurs, will pass to the connector 64 of the valve 12a so as to increase the pressure against the diaphragm 56 in this valve 12a. As these tubes 76 and 84 are being inflated or pressurized as described the other tubes 78 and 80 will be vented to the ambient air through the lines 88 and 90, respectively, and through the valves 12a and 12b, respectively. As a consequence of this the tubes 78 and 80 will at this time tend to deflate and the pressure of the air within them will normally be that of the ambient air or will be very close to that of the ambient air. Any weight on them will, of course, tend to deflate them.

Figure 9:
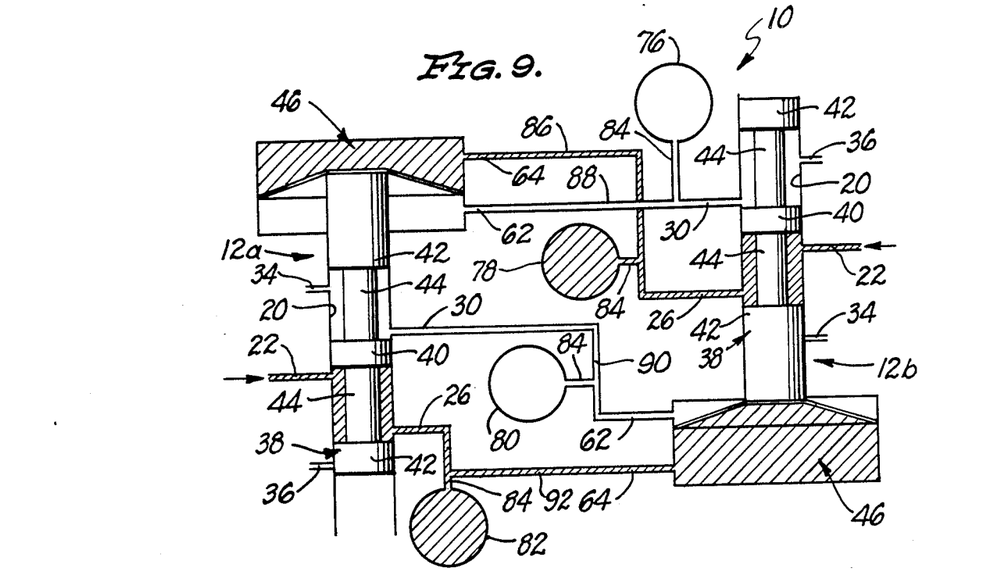

Normally the pressures will not be such that both of the diaphragms 56 will change in configuration simultaneously but instead the pressure build up will be such that one of the diaphragms 56 will change in configuration before the other. What happens when this occurs is illustrated in FIG. 9. In this figure the diaphragm 56 in the valve 12b is shown as having changed in configuration as a result of an increase in the pressure differential across it. As this occurs the spool 38 in the valve 12b is shifted so that incoming compressed air is directed through the port 26 of the valve 12b into the line 86. This will result in an increase in the pressure within the tube 78 and shortly thereafter the compressed air will be supplied through the connector 64 to the valve 12a. Concurrently the tube 76 will be vented to the ambient through the line 88.

Figure 10:
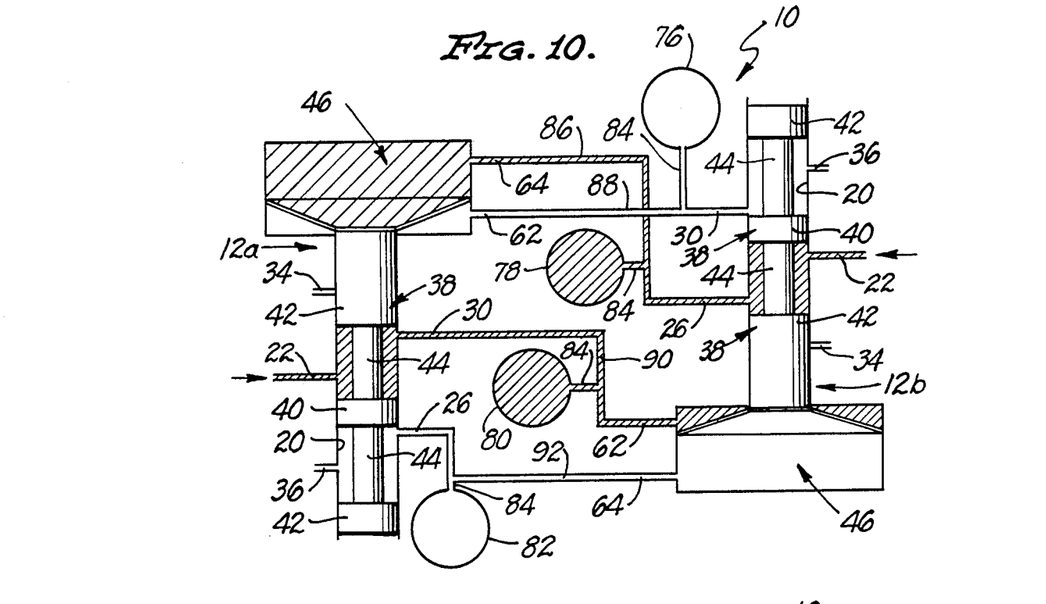

As this occurs the pressure differential across the diaphragm 56 in the valve 12a will change in position. Because of the connection of the line 88 to the connector 62. This will create a pressure differential will appear across the diaphragm 56 of the valve 12a such as to cause this valve 12a to change to a position as indicated in FIG. 10. When this occurs the inlet 22 of the valve 12a will be connected through the port 30 to the line 90 so as to convey compressed air to this line 90. As this occurs, the compressed air will fill the tube 80 or increase the air pressure within it. As a result of the valve spool 38 shifting to a position as shown in FIG. 10 the line 92 is vented to the ambient through the valve 12a the pressure within this line 92 and within the side (not separately numbered) of the diaphragm 56 in the valve 12b connected to this line 92 will drop and the tube 82 will be vented to the ambient. This alters the pressure differential across the diaphragm 56 in the valve 12b.

Figure 11:
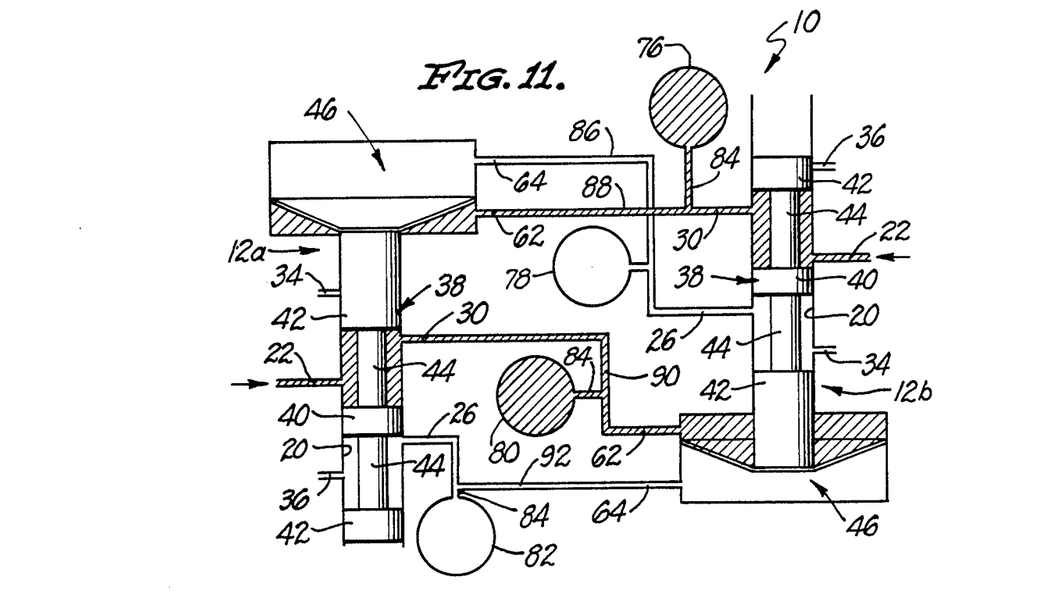

This will cause the diaphragm 56 in this valve 12b to change back to a position as shown in FIG. 11. At this point the position of the valve spool 38 in this valve 12b will be changed as described in connection with FIG. 8. this will result in an increase in the pressure applied to the diaphragm 56 in the valve 12a resulting in the diaphragm 56b and the spool 38 in the valve 12a shifting to the position shown in FIG. 8. This will, of course, start the operating cycle over again.

The speed at which the various steps indicated in the preceding discussion will take place can be varied in a number of different ways which are considered to be reasonably obvious in character. When the apparatus 74 is constructed and used as indicated the various tubes 76, 78, 80 and 82 will act more or less as accumulators. By varying the manner in which they are constructed so as to vary the way they inflate and deflate it is possible to vary the timing of the steps indicated in the preceding. Similar results can be achieved by making the lines 86, 88, 90 and 92 of a somewhat elasticized material. It is also possible to introduce it to these lines 86, 88, 90 and 92 between the tubes 76, 78, 80 and 82 and the connectors 62 and 64 valves (not shown) which will only open when a predetermined pressure has been reached in order to vary the time intervals involved in the complete apparatus 74.

When this apparatus 74 is used as indicated an individual sitting or resting against a pillow 72 will be gently messaged or stimulated with what may be termed a "rolling" sort of action. This pillow 72 can be effectively used to relieve body stress in various vehicles. It is considered highly probably that it will be effective in tending to combat the development or the presence of bedsores. If desired several of the pillows 72 can be used side by side of one another and can be operated in parallel with a particular pillow such as the pillow 72 described using a single valve structure 10. The tubes 76, 78, 80 and 82 in any such pillow 72 need not linear tubes; they can be curved in any manner desired and they can be concentric to one another.

While it the preceding reference has been made to tubes 76, 78, 80 and 82 which are inflated or within which the pressure is increased as the apparatus 74 is operated the invention does not necessarily have to be used with a compressed fluid as a "power source" which will change the manner of tubes as indicated in the preceding. This is best illustrated with reference to FIG. 7 in which there is shown a modified pillow 94 which is formed as a unitary, self-supporting structure including a four normally "open" or expanded interior tubes or passages 96 by ends (not separately shown) forming a part of the housing 98 of this pillow 94. This housing 98 is preferably formed of a resilient, flexible material such as many grades of natural or synthetic rubber which can be used so as to be relatively self supporting as shown. If desired a porous filler (not shown) such as open celled sponge rubber can be located within the passages 96 so as to reinforce the housing 98 against collapse.

Figure 7:
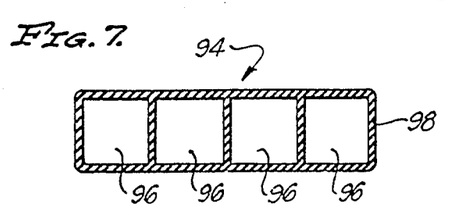
FIG. 7 is a diagrammatic cross-sectional view of an assembly of an alternate series of tubes which are intended for use instead of the series shown in FIG. 6 when the valve is to be operated using a vacuum.

When the pillow 94 is used it is connected directly to a valve structure 10 in the same manner as the pillow 72 is connected to this valve structure 10. The latter is connected to a source of a vacuum such as a vacuum line (not shown) within a hospital in order to operate the resulting apparatus (not separately numbered). Such operation reasonably corresponds to the mode of operation previously described except in one regard. As the operation is continued the tubes 96 will tend to sequentially collapse or decrease in dimension instead of tending to expand. This will result in a massage or stimulation action as described in the preceding. This type of operation using a vacuum is considered to be desirable when the invention is to be used in a hospital since a vacuum line is normally available in a hospital.

Those skilled in the field of this invention will recognize that an apparatus corresponding to the apparatus 74 described can be constructed so that the rolling or sequential action achieved can be used for conveying various items from one location to another or for other purposes. They will further realize that the precise valve structure 10 is desirable in that there is substantially no chance of this valve structure not operating as a result of an internal equilibrium. The manner in which the two valves 12a and 12b are connected is considered quite important in this regard. It is also considered important that a "snap" type of over-center action is achieved with the latter valves which tends to prevent those valves from "hanging up" in other than positions as shown.

CROSS-REFERENCE TO RELATED APPLICATION

This application is related to a concurrently executed application by the same inventors entitled "Quick-Acting Diversion Valves." (Ser. No. 017321) The entire disclosure of this related application is incorprated herein by reference.

We claim:

1. An apparatus for sequentially performing a repetitive series of mechanical actions, said apparatus including a series of independently operable mechanical means for providing a physical movement in response to a change in fluid pressure applied to it, each of said mechanical means having an inlet to receive fluid to be used in operating said apparatus, said apparatus also including regulating means for causing sequential changes in the fluid applied to all of said mechanical means in which the improvement comprises:
   said regulating means comprising a series of feedback valve means for controlling fluid flow so as to operate said mechanical means, each of said valve means having an inlet and two separate outlets and a pressure differential responsive actuating means, including two compartments and a moveable member separating said compartments, each of said outlets on each of said valve means being connected to the inlet of one of said mechanical means and to a compartment of the actuating means of another of said valve means, none of said outlets being connected to the same mechanical means and the same compartment to which another of said outlets is connected,
   said outlets, said mechanical means and said compartments being connected so that an operating cyle is commenced by supplying a fluid through one of said inlets and one of said outlets of one of said valve means to one of said mechanical means so as to cause a mechanical movement and to a compartment of another of said valve means so as to create a pressure differential between it and the other compartment in said other valve means so that such differential causes movement of the movable member separating such compartments, so as to connect a different outlet of the other valve means to the inlet thereof so as to cause a corresponding mechanical movement in the mechanical means connected to it and to initiate another corresponding action of a valve means.

2. An apparatus as claimed in claim 1 wherein:
   each of said mechanical means is an inflatable tube.

3. An apparatus as claimed in claim 2 wherein:
   said tubes are associated so as to be capable of being used to support a part of a body.

4. An apparatus as claimed in claim 1 wherein:
   each of said mechanical means is a self supporting tube capable of being reduced in internal volume by the application of a vacuum to the interior thereof.

5. An apparatus as claimed in claim 4 wherein;
   said tubes are located adjacent to one another within the interior of a self supporting housing and are formed of a flexible material, said housing being capable of being deformed by the application of a vacuum to the interior of any one of said tubes.

6. An apparatus as claimed in claim 1 wherein:
   each of said mechanical means in an inflatable tube formed of a resilient, flexible material.

7. An apparatus for sequentially performing a repetitive series of mechanical actions, said apparatus including a series of independently operable mechanical means for providing a physical movement in response to a change in fluid pressure applied to it, each of said mechanical means having an inlet for receiving fluid to be used in operating said apparatus, said apparatus also including regulating means for causing sequential changes in the fluid applied to all of said mechanical means in which the improvement comprises:

said regulating means comprises two feedback valve means, each of said feedback valve means including a valve mechanism having an inlet and two separate outlets and an internal control means for shifting fluid flow from said inlet to either of said outlets, each of said feedback valve means also including a pressure responsive actuating means for operating said internal control means so that fluid from said inlet is supplied to either of said outlets in accordance with a pressure differential, each of said actuating means having two internal compartments, said compartments being capable of receiving fluid under pressure from different sources and differential detection means for detecting a differential in pressure between said compartments, each of said actuating means also including movable means responsive to a differential in pressure detected by said detection means for supplying a mechanical force to the control means within the valve means in which it is located so as to operate such control means to change which of the outlets of said valve receives fluid from said inlet in accordance with the differential in the pressures in its internal compartments, conduit means connecting one of the outlets of one of said valve means to one of said compartments of the other of said valve means, another conduit means connecting the other of said outlets of said one of said valve means to the other of said compartments of said other valve means, further conduit means connecting one of the outlets of said other valve means to one of said compartments of said one of said valve means, still further conduit means connecting the other outlet of said other of said valve means to the other of said compartments of said one of said valve means, and there are four of said mechanical means, each of said mechanical means being associated with one of said conduit means and having its inlet connected to the conduit means with which it is associated.

8. An apparatus as claimed in claim 7 wherein:
each of said mechanical means is an inflatable tube formed of a flexible material.

9. An apparatus as claimed in claim 8 wherein:
each of said tubes is formed of resilient, flexible material.

10. An apparatus as claimed in claim 7 wherein:
said detection means in each of said actuating means comprises a diaphragm.

11. An apparatus as claimed in claim 10 wherein:
each of said diaphragms is a bistable diaphragm having two stable positions, each of said positions corresponding to said valve mechanism supplying a fluid to one of its outlets.

12. An apparatus as claimed in claim 7 wherein:
said fluid is a pressurized fluid,
each of said mechanical means is an inflatable tube formed of a resilient, flexible material,
said detection means in each of said actuating means comprises a diaphragm, each of said diaphragms is a bistable diaphragm having two stable positions, each of said positions corresponding to said valve mechanism supplying fluid to one of its outlets.

13. An apparatus as claimed in claim 7 wherein:
each of said mechanical means is a self supporting tube capable of being reduced in internal volume by the application of a vacuum to the interior thereof.

14. An apparatus as claimed in claim 13 wherein;
each of said tubes is formed of a resilient, flexible material.

15. An apparatus as claimed in claim 13 wherein:
said detection means in each of said actuating means comprises a diaphragm.

16. An apparatus as claimed in 15 wherein:
each of said diaphragms is a bistable diaphragm having two stable positions, each of said positions corresponding to said valve mechanism connecting the inlet to one of its outlets.

17. A process of sequentially operating a series of independently operable mechanical means using two feedback valve means, each of said mechanical means having a fluid inlet, each of said mechanical means being capable of producing a physical movement in response to a change in the pressure of fluid applied to its inlet, each of said valve means having a fluid inlet, two fluid outlets, mechanically operable internal control means for connecting its inlet to either of its outlets and a pressure responsive actuating means for providing mechanical movement to operate its control means so as to connect its inlet to either of its outlets, each of said actuating means having two compartments separated by a member which moves in response to a differential in pressures in such compartments in order to provide said mechanical movement, each of the outlets of each of the valve means being connected to one of the compartments of the actuating means of the other of said valve means and to an inlet of one of said mechanical means, said process including the steps of:

supplying a fluid through the inlet of a first of said valve means to a first outlet of said first valve means and thence to the inlet of a first of said mechanical means so as to cause a physical movement of said first of said mechanical means and to a first compartment of the second of said valve means so as to change the pressure therein until there is a differential in pressures between the first and second compartments of said second valve means such that said member of said second valve means moves, using the movement of said member of said second valve means so as to operate the control means of said second valve means to move so that fluid is supplied through the inlet of said second valve means to a first outlet of said second valve means and thence to the inlet of a second of said mechanical means so as to cause a physical movement of said second of said mechanical means and to a first compartment of said first valve means so as to change the pressure therein until the pressure therein is such that there is a differential in pressures between the first and second compartments of said first valve means such that said member of said first valve means moves, using the movement of said member of said first valve means so as to operate the control means of said first valve means to move so that fluid is supplied through the inlet of said first valve means to a second outlet of said first valve means and thence to the inlet of a third of said mechanical means so as to cause a physical movement of said third of said mechanical means and to a second compartment of said second valve means so as to change the pressure therein until there is a differential in pressures between the first and second compartments of said second valve means such that said member of said second valve means moves, using the movement of said member of said second valve means so as to operate the control means of said second valve means to move so that fluid is supplied through the inlet of said second valve means to a second outlet of said second valve means and thence to the inlet of a fourth of said mechanical means so as to cause a physical movement of a fourth of said mechanical means and to a second compartment of said first valve means so as to change the pressure therein until there is a differential in pressures between the first and second compartments of said first valve means such that said member of said first valve means moves, and using the movement of said member of said first of said valve means so as to operate the control means of said first valve means so that fluid is supplied to recommence a cycle of operation comprising the sequence of steps herein defined.

18. A process as defined in claim 17 wherein:
each of said mechanical means is a tube capable of being inflated and deflated.

19. A process as defined in claim 18 wherein:
said tubes are associated so as to be capable of being used as a support for a body.

20. A process as claimed in claim 17 wherein:
said members separating said compartments of said actuating means of said valves are diaphragms.

21. A process as claimed in claim 20 wherein:
said diaphragms are bi-stable diaphragms which can only change from one position to another without being stable in any in between position.

22. A process as defined in claim 17 wherein:
each of said mechanical means is a tube capable of being inflated and deflated,
said tubes are associated so as to be capable of being used as a support for a body,
said members separating said compartments of said actuating means of said valves are diaphragms,
said diaphragms are bi-stable diaphragms which can only change from one position to another without being stable in any in between position.

23. An apparatus for sequentially operating a series of independently operable mechanical means for providing a physical movement in response to a change in fluid pressure which comprises:

a series of feedback valve means, each of said feedback valve means including a housing means for use in distributing a fluid, an actuating means for use in providing a physical movement and a mechanical actuator for transmitting physical motion, said housing means of each of said valve means including a distribution cavity, inlet port means, return port means and two service passage means, all of said port and passage means being in communication with said cavity, a manifold means for supplying all of said inlet port means, each of said valve means being capable of being operated to either (1) connect a first of its service passage means to its inlet port means and the second of its service passage means to its return port means or (2) the second of its service passage means to its inlet port means and the first of its service passage means to its first of its return port means, said actuating means of each of said valve means including an internal cavity, a movable means located within said cavity for separating said cavity into two compartments the volumes of which will vary depending upon the position of said movable means, two additional service passage means each of which is connected to one of said compartments, said movable means being connected to the mechanical actuator in the valve means within which it is located, line means connecting each of said service port means of each of said valve means with one of said mechanical means and a single additional service port means on another of said valve means so as to permit fluid to flow between such service port means and such mechanical means, whereby when fluid under pressure is supplied to an inlet port means such fluid will flow so as to be distributed by the manifold in the valve means within which such inlet port means is located to one of said line means so as to operate one of the mechanical means and the actuating means in communication with it to the return passage means of such valve means, such flow resulting in the operation of the actuating means connected to such lines and causing the movable means of such actuating means to be moved so as to cause a change in the porting of the valve means in which said actuating means is located in order to cause the further operation of a mechanical means and the actuating means connected to it.

* * * * *